United States Patent [19]

Thomas

[11] Patent Number: 4,681,292
[45] Date of Patent: Jul. 21, 1987

[54] PNEUMATIC SEAT SUPPORT WITH LINKAGE AND HORIZONTAL SHOCK ABSORBERS

[76] Inventor: Scipio Thomas, 4444 N. Division, Davenport, Iowa 52806

[21] Appl. No.: 880,351

[22] Filed: Jun. 25, 1986

Related U.S. Application Data

[63] Continuation of Ser. No. 691,290, Jan. 14, 1985, Pat. No. 4,632,355.

[51] Int. Cl.$^4$ ............................................. F16M 13/00
[52] U.S. Cl. ..................................... 248/584; 248/421; 248/422; 297/195; 267/132
[58] Field of Search ............... 248/560, 564, 580, 581, 248/584, 591, 592, 593, 595, 599, 602, 618, 636, 638, 157, 421, 422; 297/301-302, 243, 195; 267/131-132, 11 R, 11 A, 120; 188/303; 296/63, 65 R; 180/219

[56] References Cited

U.S. PATENT DOCUMENTS

| | | | |
|---|---|---|---|
| 2,986,199 | 5/1961 | Ferreira | 248/584 |
| 3,339,906 | 9/1967 | Persson | 267/131 |
| 3,724,797 | 4/1973 | Freitag | 248/593 |
| 3,736,020 | 5/1973 | Pilachowski | 267/131 |
| 3,747,888 | 7/1973 | Heckett | 248/584 |
| 3,752,432 | 8/1973 | Lowe | 248/564 |
| 3,826,457 | 7/1974 | Huot de Longchamp | 248/564 |
| 3,897,036 | 7/1975 | Nystrom | 248/564 |
| 4,087,069 | 5/1978 | Hall | 248/631 |
| 4,105,195 | 8/1978 | Lamberts | 267/120 |
| 4,241,894 | 12/1980 | Okuyama | 248/593 |

FOREIGN PATENT DOCUMENTS

| | | | |
|---|---|---|---|
| 1806380 | 6/1970 | Fed. Rep. of Germany | 248/564 |
| 1955531 | 5/1971 | Fed. Rep. of Germany | 248/504 |
| 452580 | 10/1949 | Italy | 248/584 |
| 813165 | 5/1959 | United Kingdom | 297/302 |
| 1043715 | 9/1966 | United Kingdom | 248/584 |

Primary Examiner—Ramon S. Britts
Assistant Examiner—Robert A. Olson
Attorney, Agent, or Firm—Glenn H. Antrim

[57] ABSTRACT

Horizontal pneumatic shock absorbers are connected through gears and levers to convert the longitudinal control of the shock absorbers to vertical control of seat frames of vehicles. Particularly, a preferred embodiment of a resilient support has sufficiently low height to permit placement of the support between the seat and the frame of a motorcycle for supporting the seat at a normal level. The preferred embodiment has, in addition to a pneumatic shock absorber for support, a shock absorber applying an opposing force for controlling bounce. Also, spring couplings connect the levers for supporting the seat to provide resilience for cushioning rapid shocks of moderate intensity while the shock absorbers function more flowly for longer excursions.

3 Claims, 5 Drawing Figures

PNEUMATIC SEAT SUPPORT WITH LINKAGE AND HORIZONTAL SHOCK ABSORBERS

The following is a continuation of the applicant's earlier filed application Ser. No. 06/691,290, filed Jan. 14, 1985, now U.S. Pat. No. 4,632,355.

BACKGROUND OF THE INVENTION

This invention relates to pneumatic supports or suspensions for vehicle seat and particularly to suspensions having conventional pneumatic shock absorbers for support and for controlling bounce and linkages for positioning the shock absorbers horizontally.

Gas spring suspensions for vehicle seats are shown in U.S. Pat. No. 4,105,195 issued to Ervins H. Lamberts on Aug. 8, 1978, in U.S. Pat. No. 3,736,020 issued to Pilachowsky et al. on May 29, 1973, and in U.S. Pat. No. 4,087,069 issued to Hall et al. on May 2, 1978. Lamberts' seat support has an elongated, vertical air cushion with a special height control to admit air from a pressurized source for greater height and to discharge air to atmosphere for lower height. Pilachowsky's support is also vertically oriented and has a particular mounting for snowmobiles, and Hall's namely horizontal support utilizes drums and cables requiring much lateral space available under bench-type automobile seats. These supports are not compact enough to fit between frames and seats of motorcycles, and neither do they have opposing spring devices for controlling bounce.

SUMMARY OF THE INVENTION

In an embodiment according to the present invention, two commercially available pneumatic shock absorbers and a linkage comprising levers and gears are arranged in a narrow horizontal space. The linkage and shock absorbers are then compact enough vertically to fit between the seat and the frame of a motorcycle. One of the shock absorbers namely supports a loaded seat, and the other shock absorber functions to apply force in a downward direction for controlling bounce. The linkage changes the direction of the controlling force of the plungers of the shock absorbers from horizontal to vertical.

An air pump connected to the cylinder of the supporting shock is operative to pressurize the supporting shock for providing a desired intermediate height of the seat as required to support the weight of one or two occupants of the seat. Since each of the shock absorbers are connected through the same or similar linkages to the seat, the pressure in the shock absorber for control of bounce is less than that in the shock absorber providing the support. In the preferred embodiment, the supporting force is proportional to the difference in pressures within the cylinders of the shock absorbers.

The seat support according to this invention may be modified by using a compression, helical spring in place of the second shock absorber. Other optional features are additional springs in series in the linkage connecting the shock absorbers to the seat. Either the preferred embodiment requiring minimal vertical space as required for motorcycles, or another embodiment with slightly greater height can be used in other vehicles such as snowmobiles.

DESCRIPTION OF THE PREFERRED EMBODIMENTS

Figure 1:
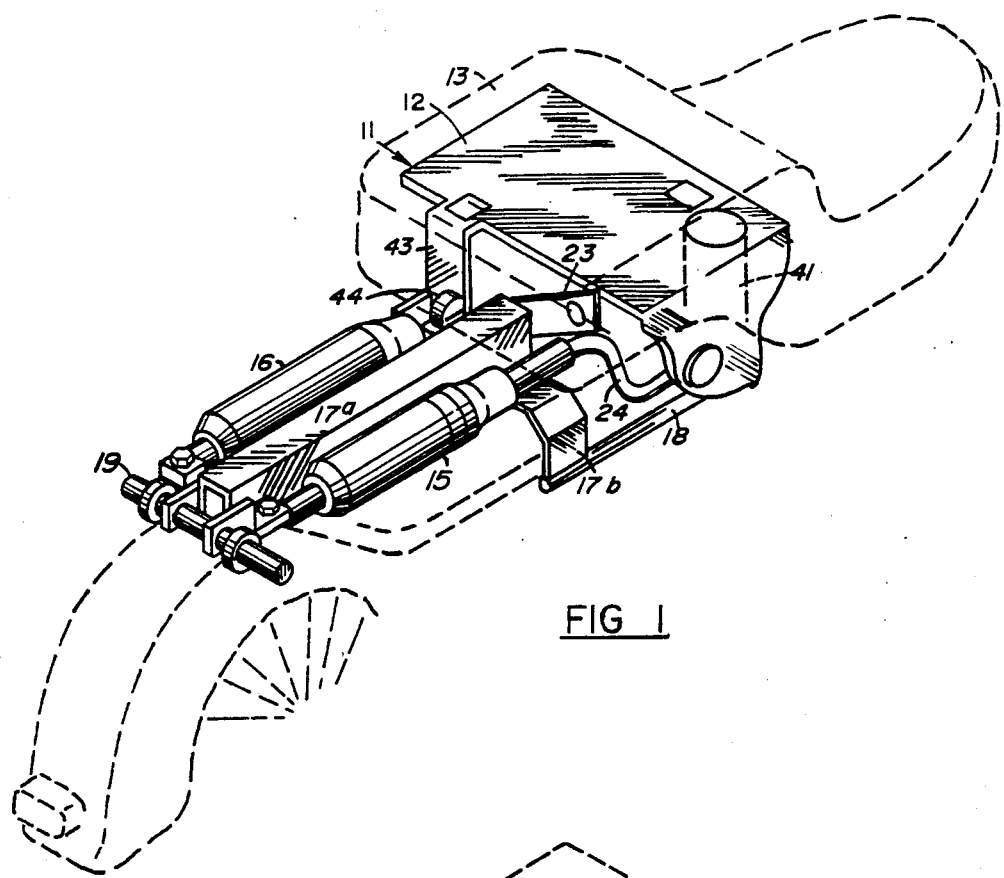
FIG. 1 is a fragmentary, oblique, rear, right side view of a motorcycle showing an attached seat support of the present invention.
Figure 2:
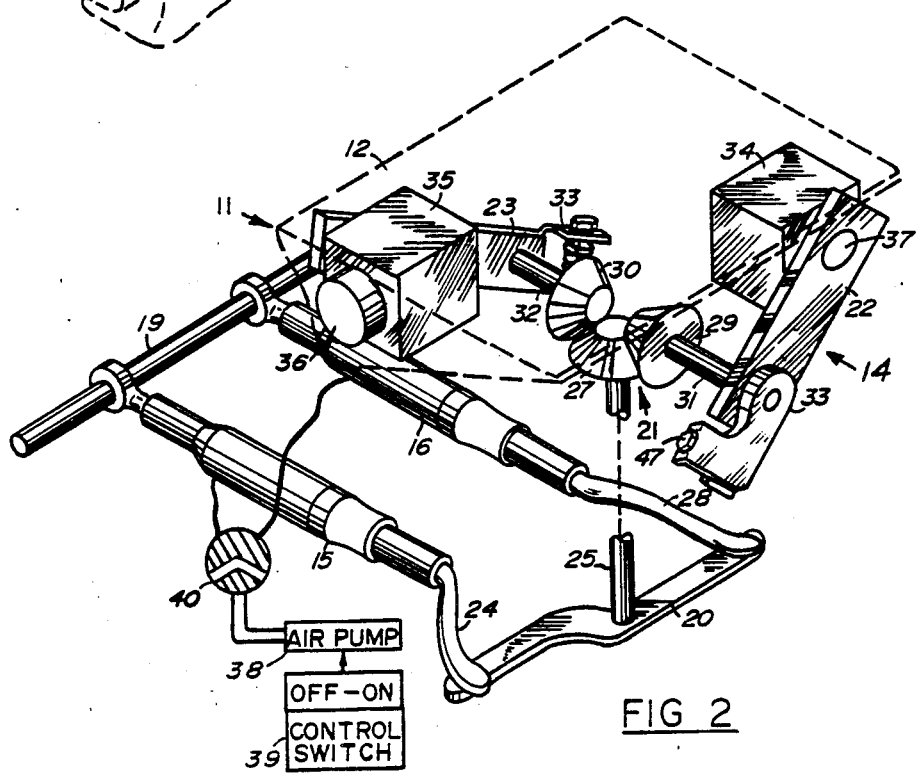
FIG. 2 is a schematic, oblique, front, right side view of the support of FIG. 1.

As shown in FIG. 1, a seat support 11 according to the present invention has a seat frame 12 below the rear portion, the portion for a passenger, of a motorcycle seat 13. A linkage 14 shown in FIG. 2 is located below the seat frame 12, and shock absorbers 15 and 16 extend rearward and substantially horizontally from just below the lower rear edge of the seat frame 12 to a support frame 17. A support frame 17 has interconnected portions 17a, 17b, (FIG. 1) and 17c (FIG. 3) removably fastened to frame 18 of the motorcycle.

The rear or passenger's portion of a conventional seat 13 fits down over the seat frame 12 and the slightly lower operator's portion projects forward in front of the seat frame 12. As described below with reference to FIG. 3, a linear, ball bushing bearing is utilized in a guide to permit free vertical motion of the seat frame 12 in spite of leverage caused by weight being in front.

As shown in FIGS. 1 and 2, each of the pneumatic shock absorbers 15 and 16 have a rear end of a cylinder connected to the motorcycle frame 18 by being connected to a rod 19 of the seat frame 17a. The plungers of the shock absorbers 15 and 16 are connected to respective opposite ends of a lever 20 of the linkage 14. The lever 20 is connected to a set of miter gears 21 to move in unison seat-supporting levers 22 and 23 connected between the set of gears 21 and the seat frame 12. Summarizing, the shock absorbers 15 and 16 may be considered to be spring devices connected in series with the linkage 14 to the seat frame 12. The linkage 14 provides stable, resilient support for the seat frame 12 as controlled by the shock absorbers 15 and 16 and permits the shock absorbers to be positioned horizontally such that the complete seat support 11 can be positioned below a motorcycle seat to maintain the seat at its normal level.

Figure 3:
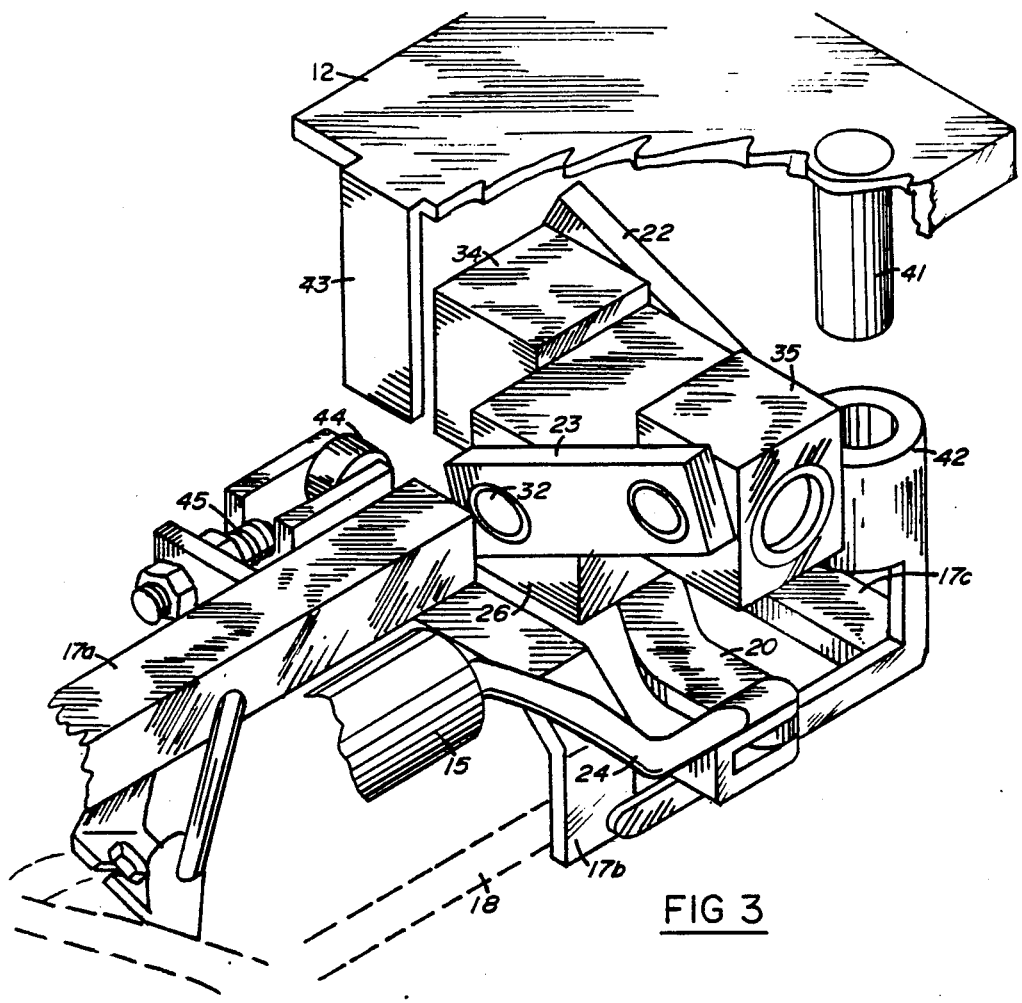
FIG. 3 is an enlarged view of a portion of FIG. 1 with its seat frame exploded upward.

In detail, a rod 24 connected to the outer end of the plunger of the shock absorber 15 is connected rotatively to the right end of the lever 20 (FIG. 3). As shown, for particular applications, the rod 24 may be curved downwardly such that the lever 20 may be somewhat below the level of the shock absorbers 15 and 16. The center of the lever 20 (FIG. 2) is connected to the lower end of a vertical shaft, the shaft extending upward into a gear box 26 (FIG. 3) and connected axially to a miter gear 27 (FIG. 2). The opposite end of the lever 20 is likewise connected by a rod 28 attached to the plunger of the shock absorber 16 such that when the seat frame is being forced downward, the plunger of the shock absorber 15 is being retracted while the plunger of the shock absorber 16 is being extended.

The miter gear 27 that is rotated by the lever 20 is meshed with longitudinally opposite miter gears 29 and 30, the gear 29 having a horizontal shaft 31 extending forward out of the gear box 26, and the gear 30 having a horizontal shaft 32 extending rearward. The outer ends of the shafts 31 and 32 are either fastened rigidly to the lower ends of respective levers 22 and 23 respectively or fastened through a resilient coupling 33 shown in FIG. 4 described below. Since the shafts 31 and 32 extend in opposite directions from their respective miter gears 29 and 30 and the lever 22 extends upwardly to the left while the lever 23 extends upwardly to the right, the upper ends of the levers 22 and 23 are always at an even level regardless of height as controlled by operation of the lever 20 and the gears 27, 29, and 30. For supporting the seat frame 12, the upper ends of the levers 22 and 23 are coupled to opposite ends of the seat frame through pillow blocks 34 and 35. As shown in FIG. 2, a shaft 36 extends laterally inward from a turned-down edge of the right side of the seat frame 12 and fits through the bearing of the pillow block 35. Likewise, a similar shaft is connected to the left side of the seat frame 12, and the bearing of the pillow block 34 is a sliding fit about the shaft. The upper end of the lever 22 is pivoted about the longitudinal axis of the left pillow block 34 by a pivot 37, and likewise the right pillow block 35 is pivotally coupled to the upper end of the lever 23. The distances of the lateral, sliding movements of the pillow blocks 34 and 35 are quite short, and obviously the proportions including the length of the levers 22 and 23 must be chosen such that the blocks 34 and 35 do not contact the adjacent turned down edges of the seat frame 12 before the frame 12 is in its lowest, desired position.

The weight of the operator and any passenger on the motorcycle seat 13 (FIG. 1) is namely supported by the right pneumatic shock absorber 15 (FIG. 2), and rebound or bounce is controlled by the left pneumatic shock absorber 16. A usual air pump 38 controlled by a switch 39 has its output connected selectively through a two-way valve 40 to the cylinders of the pneumatic shock absorbers 15 and 16. Since the plunger of the shock absorber 15 is retracted to a greater extent by adding weight to the seat 11, the shock absorber 15 is provided with the greater pressure, and the shock absorber 16 is provided with sufficient air to control bounce most effectively. Since the height of the seat 13 is proportional to the difference in pressures with the shocks 15 and 16, the pressures are to be adjusted alternately. An air bleeding valve (not shown) for each of the shock absorbers 15 and 16 is provided.

As shown in FIG. 3, the vertical guide comprises namely a strong shaft 41 depending vertically from an upper end fastened rigidly near the right, front corner to the lower surface of the seat frame 12, and a heavy-duty, linear ball bushing bearing 42 attached rigidly to the support frame 17 for receiving the shaft 41. An additional optional guide comprises a flat bar, depending from the rear edge of the seat frame 12 near the left, rear corner, and a roller 44 connected by a fore-to-aft adjusting screw 45 to the longitudinal, central member 17a of the support frame. The roller has a lateral, horizontal axis, and its fore-to-aft position is adjusted by the screw 45 in a usual manner to have the roller bear against the rear surface of the bar 43. The position of the roller 44 must be carefully adjusted such that it is retracted a very short distance after it has been positioned forward enough to cause the least noticeable binding of the shaft 41 in the linear bearing 42.

Figure 4:
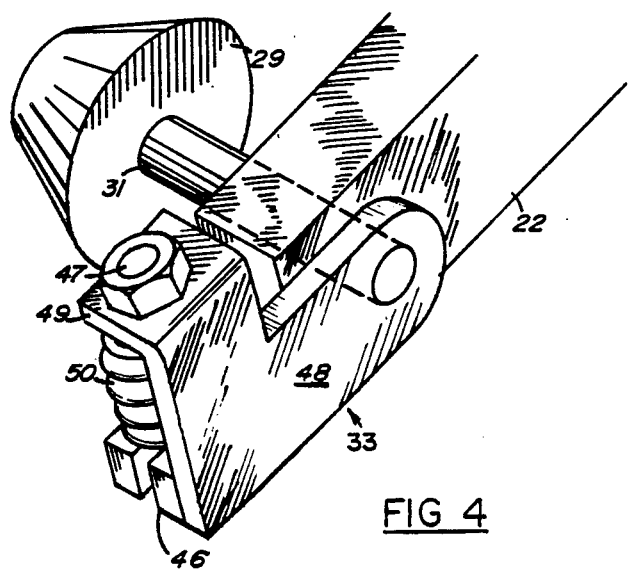
FIG. 4 is an enlarged view of a lower end of a lever supporting the seat frame of FIG. 2 to show a resilient coupling.

For still greater resilience, the coupling 33 of FIG. 4 is used to couple each of the shafts 31 and 32 of the set of gears 21 (FIG. 2) to the respective levers 22 and 23. With particular reference to the front lever 22, the normally lower end of its edge that faces a downward slanting direction is extended a moderate distance beyond the shaft 31, and the lower end of this extended portion 46 has a slot midway between the sides of the portion 46 to accommodate the insertion of a shank of a machine bolt 47 parallel to the sides of the lever 22 and perpendicular to its lower slanting edge. The shaft 31 extends through the lever 22 that is rotative on the shaft, and a short coupling lever 48 is rigidly secured to the end of the shaft 31 adjacent the outer side of the lever 22. The coupling lever 48 extends from the shaft 31 to a position adjacent the slotted portion 46 and has an upper portion 49 curved over and spaced from the slotted portion 46. A helical compression spring 50 is inserted between the slotted portion 46 and the upper portion 49 such that the bolt 47 can be inserted through a hole of the upper portion 49, through the coils of the spring 50 and the slot in the end of the portion 46. The bolt 47 is tightened to compress the spring 50 a desired amount for a comfortable ride.

The strength of the similar springs 50 connected to levers 22 and 23 are chosen such that the springs are substantially compressed by the weight of the occupants of the seat 13. The springs operate effectively on a motorcycle to cushion the occupants while the motorcycle is traveling quite rapidly over moderately smooth highways such as arterial highways. Under this condition the pneumatic shock absorbers may operate too slowly, and anyway their operation is not required because the faster springs have sufficient travel for the rapid short excursions. At slower speeds or over roughed roads, the pneumatic shock absorbers themselves smoothen the ride materially, and the springs 50 cooperate with the shock absorbers to lower the seat 13 smoothly as the wheels of the motorcycle have just passed over a bump.

Figure 5:
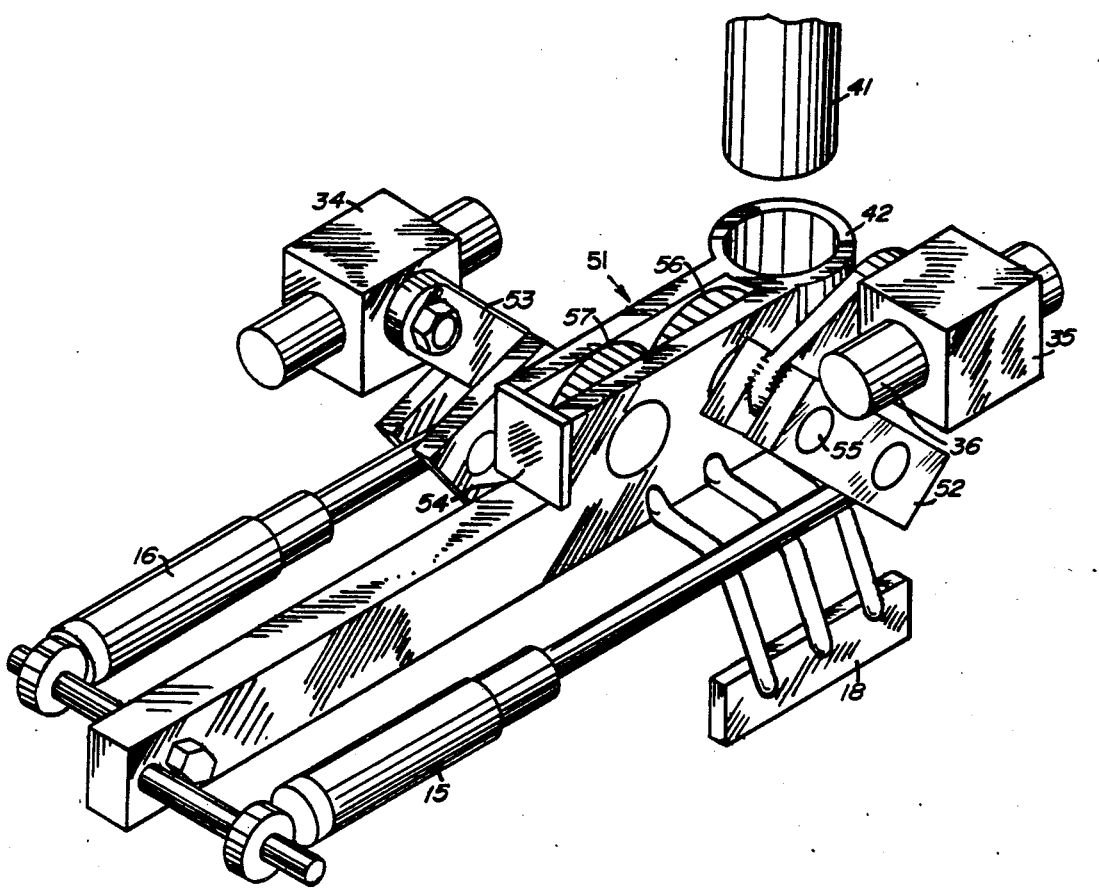
FIG. 5 is a fragementary, oblique, rear, right side view of supporting pneumatic shock absorbers and linkage of another embodiment, this linkage being useable in place of the linkage shown in FIG. 2 wherever a seat support for various kinds of vehicles can have slightly greater height than the low height suitable for motorcycles.
Figure 5:
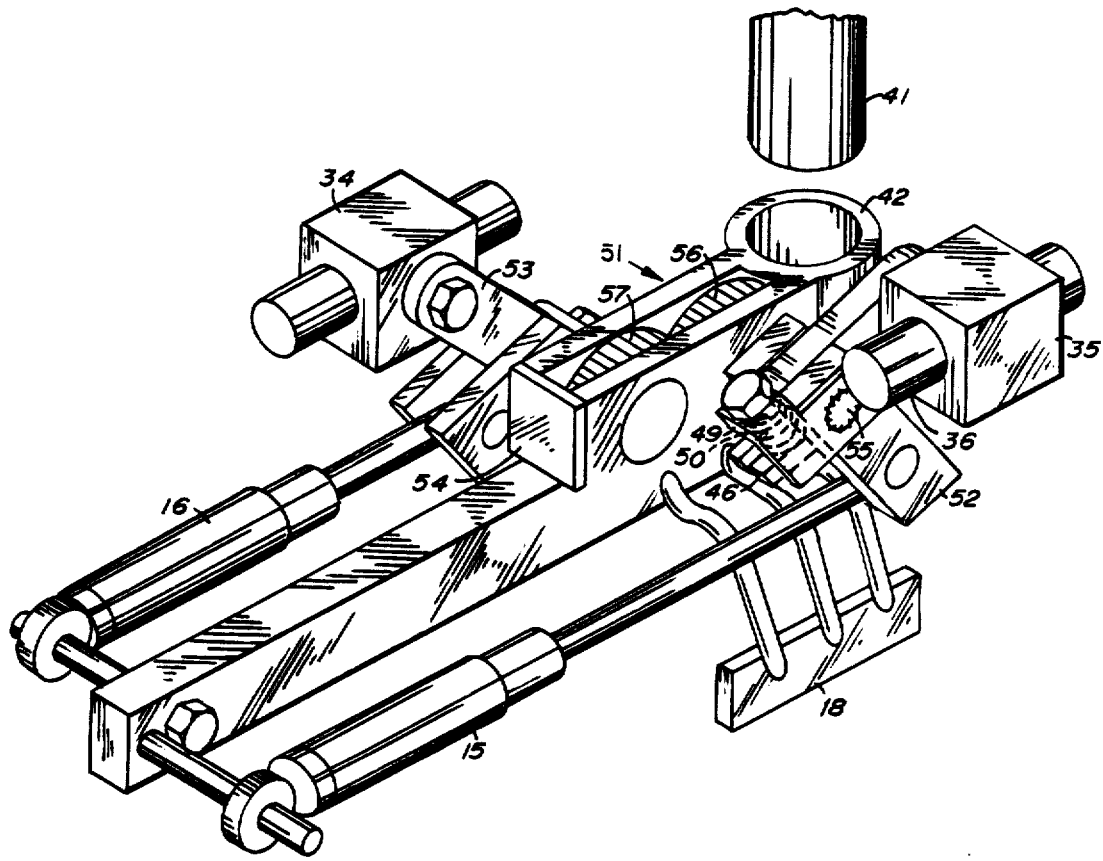

A different linkage 51 shown in FIG. 5 may be substituted for the linkage 14 of FIG. 2 to provide a seat support with slightly greater height. Since the use of the linkage 51 on motorcycles would usually require the passenger seats to be elevated somewhat, this simpler linkage is more suitable for use in snowmobiles and other vehicles. In FIG. 5, angular levers 52 and 53 replace the levers 20, 22, and 23 of FIG. 2, and a set of spur gears 54 replace the set of miter gears 21.

The lower end of a lower straight portion of the lever 52 is pivotally connected to the plunger of the pneumatic shock absorber 15; the intermediate angular portion is connected to a shaft 55 of a spur gear 56 within the set 54; and the outer, or front, end of the lever 52 is pivotally connected to the pillow block 35. The spur gear 56 is meshed with the spur gear 57, and the shaft of the gear 57 is connected to the immediate angular portion of a lever 53. The lever 53 and its connections are similar to the lever 52 and its connections; the lower end of the lever being connected to the plunger of the pneumatic shock absorber 16, and the outer, or rear end being connected to the pillow block 34. Rather than having the upper and lower straight portions of each of the levers 52 and 53 welded rigidly together at an angle, the upper portion may be separate and be coupled by two spaced members and a spring as suggested by the coupling 33 in FIG. 4. The lower straight portion of each lever 52 or 53 and a member corresponding to the member or coupling lever 48 would be secured rigidly to a shaft of a corresponding spur gear 56 or 57, and a member corresponding to the extended end of the lever 22 could be secured to the inner end of the upper portion of each lever 52 or 53. As described above with reference to FIG. 4, a spring and adjusting bolt between the members corresponding to the members 46 and 48 would provide additional resilience.

Both embodiments of a seat support shown in FIGS. 2 and 5 may be modified by substituting a helical spring assembly for the pneumatic shock absorber 16. The helical spring assembly may be the type where a rod to be connected in place of the plunger of the pneumatic shock absorber extends through the spring to connect to the opposite end of the spring such that the spring is compressed as the rod is extended. Then both the spring and the shock absorber 15 operate simultaneously to increase resistance to downward movement of the seat frame 12.

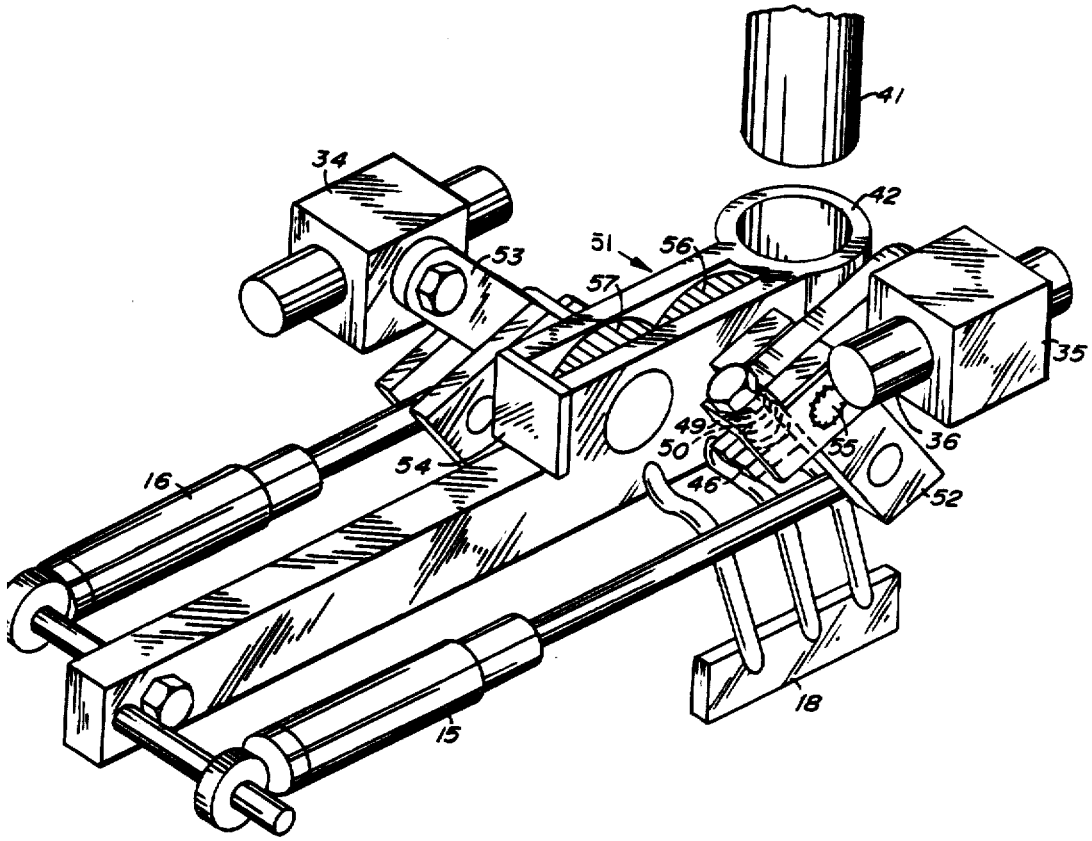

I claim:

1. A pneumatic support for a seat comprising:
    a seat frame to which a seat is to be attached for support,
    a main frame of said support to be connected to a vehicle,
    guiding means connected between said seat frame and said main frame to retain said seat frame substantially horizontal while permitting in a vertical direction free reciprocal travel of said seat frame relative to said main frame,
    a linkage comprising first and second levers and gear means, said gear means having first and second shafts for said first and second levers respectively, each of said first and second levers having first and second ends and an intermediate pivotal point, said intermediate pivotal point of each of said levers being connected to the respective one of said first and second shafts, said gear means restraining said first and second levers to rotate in unison to maintain said first ends of said first and second levers at an even height,
    pivotal means for coupling said seat frame at respective spaced points to said first ends of said first and second levers,
    a first pneumatic shock absorber positioned substantially horizontal and connected between said main frame and said second end of said first lever, and
    an elongated spring means positioned substantially horizontal and connected between said main frame and said second end of said second lever, said first pneumatic shock absorber and said elongated spring means cooperating to provide resilient support at a desired height for said seat.

2. A pneumatic support as claimed in claim 1 wherein said elongated spring means is a second pneumatic shock absorber, said first shock absorber being retracted during downward movement of said seat frame and having sufficient pressure to support said seat frame and said seat while loaded, said second shock absorber being extended simultaneously during downward movement of said seat frame and therefore during upward movement being retracted to exert increasing force opposing upward movement of said seat frame and said first pneumatic shock absorber normally exerting greater force than that of said secord pneumatic shock absorber.

3. A pneumatic support as claimed in claim 1 wherein said first and second levers have respective upper portions extending from said respective shafts of said gear means to said seat frame and respective lower portions extending from said respective shafts to said respective first pneumatic shock absorber and said elongated spring means, said lower portions of said first and second levers being rigidly secured to said respective shafts, said upper portions being rotative within a limited angle about said respective shafts,
    a resilient coupling between said upper and said lower portions of each of said first and second levers, each of said resilient couplings having a first member secured approximate said respective shaft to said respective upper portion and a second member secured to said respective shaft and to said respective lower portion, and
    a spring disposed between said first member and said second member of each of said resilient couplings to restrain resiliently rotation within said limited angle of said upper portions of said first and second levers relative to said respective shafts.

* * * * *

UNITED STATES PATENT AND TRADEMARK OFFICE
CERTIFICATE OF CORRECTION

PATENT NO. : 4681292

DATED : 7/21/87

INVENTOR(S) : Scipio Thomas

It is certified that error appears in the above-identified patent and that said Letters Patent is hereby corrected as shown below:

The Title Page should be deleted to appear as per attached Title Page.

Figure 5 should be deleted to appear as per attached Figure 5.

Signed and Sealed this

Twelfth Day of January, 1988

Attest:

DONALD J. QUIGG

*Attesting Officer*  *Commissioner of Patents and Trademarks*

United States Patent [19]
Thomas

[11] Patent Number: 4,681,292
[45] Date of Patent: Jul. 21, 1987

[54] PNEUMATIC SEAT SUPPORT WITH LINKAGE AND HORIZONTAL SHOCK ABSORBERS

[76] Inventor: Scipio Thomas, 4444 N. Division, Davenport, Iowa 52806

[21] Appl. No.: 880,351

[22] Filed: Jun. 25, 1986

Related U.S. Application Data

[63] Continuation of Ser. No. 691,290, Jan. 14, 1985, Pat. No. 4,632,355.

[51] Int. Cl.⁴ ............................................. F16M 13/00
[52] U.S. Cl. .................................. 248/584; 248/421; 248/422; 297/195; 267/132
[58] Field of Search ............... 248/560, 564, 580, 581, 248/584, 591, 592, 593, 595, 599, 602, 618, 636, 638, 157, 421, 422; 297/301-302, 243, 195; 267/131-132, 11 R, 11 A, 120; 188/303; 296/63, 65 R; 180/219

[56] References Cited

U.S. PATENT DOCUMENTS

| | | | |
|---|---|---|---|
| 2,986,199 | 5/1961 | Ferreira | 248/584 |
| 3,339,906 | 9/1967 | Persson | 267/131 |
| 3,724,797 | 4/1973 | Freitag | 248/593 |
| 3,736,020 | 5/1973 | Pilachowski | 267/131 |
| 3,747,888 | 7/1973 | Heckett | 248/584 |
| 3,752,432 | 8/1973 | Lowe | 248/564 |
| 3,826,457 | 7/1974 | Huot de Longchamp | 248/564 |
| 3,897,036 | 7/1975 | Nystrom | 248/564 |
| 4,087,069 | 5/1978 | Hall | 248/631 |
| 4,105,195 | 8/1978 | Lamberts | 267/120 |
| 4,241,894 | 12/1980 | Okuyama | 248/593 |

FOREIGN PATENT DOCUMENTS

| | | | |
|---|---|---|---|
| 1806380 | 6/1970 | Fed. Rep. of Germany | 248/564 |
| 1955531 | 5/1971 | Fed. Rep. of Germany | 248/504 |
| 452580 | 10/1949 | Italy | 248/584 |
| 813165 | 5/1959 | United Kingdom | 297/302 |
| 1043715 | 9/1966 | United Kingdom | 248/584 |

Primary Examiner—Ramon S. Britts
Assistant Examiner—Robert A. Olson
Attorney, Agent, or Firm—Glenn H. Antrim

[57] ABSTRACT

Horizontal pneumatic shock absorbers are connected through gears and levers to convert the longitudinal control of the shock absorbers to vertical control of seat frames of vehicles. Particularly, a preferred embodiment of a resilient support has sufficiently low height to permit placement of the support between the seat and the frame of a motorcycle for supporting the seat at a normal level. The preferred embodiment has, in addition to a pneumatic shock absorber for support, a shock absorber applying an opposing force for controlling bounce. Also, spring couplings connect the levers for supporting the seat to provide resilience for cushioning rapid shocks of moderate intensity while the shock absorbers function more flowly for longer excursions.

3 Claims, 5 Drawing Figures